(12) United States Patent
Hwang et al.

(10) Patent No.: US 9,340,099 B2
(45) Date of Patent: May 17, 2016

(54) HYBRID POWER INTEGRATED TRANSMISSION SYSTEM AND METHOD THEREOF

(71) Applicant: National Sun Yat-Sen University, Kaohsiung (TW)

(72) Inventors: Guan-Shyong Hwang, Kaohsiung (TW); Chih-Lin Lin, Kaohsiung (TW); Der-Min Tsay, Kaohsiung (TW); Jao-Hwa Kuang, Kaohsiung (TW); Bor-Jeng Lin, Kaohsiung (TW)

(73) Assignee: National Sun Yat-Sen Univeersity, Kaohsiung (TW)

( * ) Notice: Subject to any disclaimer, the term of this patent is extended or adjusted under 35 U.S.C. 154(b) by 0 days.

(21) Appl. No.: 14/606,169

(22) Filed: Jan. 27, 2015

(65) Prior Publication Data
US 2015/0328971 A1   Nov. 19, 2015

(30) Foreign Application Priority Data
May 15, 2014   (TW) .............................. 103117153 A (51) Int. Cl.
*B60K 6/365*   (2007.10)
*F16H 3/00*   (2006.01)
*F16H 3/66*   (2006.01)
*B60K 6/28*   (2007.10)

(52) U.S. Cl.
CPC . *B60K 6/365* (2013.01); *B60K 6/28* (2013.01); *F16H 3/006* (2013.01); *F16H 3/66* (2013.01); *F16H 3/666* (2013.01); *F16H 2200/2035* (2013.01); *Y10S 903/907* (2013.01); *Y10S 903/911* (2013.01)

(58) Field of Classification Search
CPC .......... B60K 6/365; B60K 6/28; F16H 3/006; F16H 3/666
See application file for complete search history.

(56) References Cited

U.S. PATENT DOCUMENTS

| | | | | |
|---|---|---|---|---|
| 3,046,814 | A * | 7/1962 | Soehrman | ........... F16H 37/0846 475/211 |
| 4,191,070 | A * | 3/1980 | McKinniss | ............. F16H 3/721 475/302 |
| 4,936,165 | A * | 6/1990 | Doyle et al. | .......... F16H 37/084 475/151 |
| 6,387,004 | B1 * | 5/2002 | Parrish | ................... B60K 6/365 475/5 |
| 8,303,447 | B1 | 11/2012 | Kim et al. | |
| 8,409,052 | B2 | 4/2013 | Ishikawa | |
| 8,500,585 | B2 | 8/2013 | Kim et al. | |
| 8,548,662 | B2 | 10/2013 | Kishi et al. | |
| 8,585,530 | B2 * | 11/2013 | Hwang | ..................... F16H 3/72 475/207 |
| 8,585,531 | B2 * | 11/2013 | Hwang | ..................... F16H 3/72 475/207 |
| 8,585,532 | B2 * | 11/2013 | Hwang | ..................... F16H 3/72 475/207 |

(Continued)

*Primary Examiner* — Derek D Knight
(74) *Attorney, Agent, or Firm* — Alan D. Kamrath; Kamrath IP Lawfirm, P.A.

(57) ABSTRACT

A hybrid power transmission integrated system includes a first planetary gear train, a second planetary gear train, a first transmission-connecting set and a second transmission-connecting set. A control method includes: arranging the first transmission-connecting set to provide a first power input end; arranging the second transmission-connecting set to provide a second power input end, a first power output end and a free transmission end; connecting the first and second transmission-connecting sets to the first and second planetary gear trains; controlling the free transmission end performed as a second power output end or a third power input end such that powers are converted via the second power output end and are stored; supplying the stored power to the hybrid power transmission integrated system via the second or third power input end.

12 Claims, 5 Drawing Sheets

(56) References Cited

U.S. PATENT DOCUMENTS

| | | | | |
|---|---|---|---|---|
| 8,585,533 B2* | 11/2013 | Hwang | | F16H 3/72 |
| | | | | 475/207 |
| 8,905,893 B2* | 12/2014 | Vedeneev | | F16H 3/74 |
| | | | | 475/330 |
| 2007/0173366 A1* | 7/2007 | Goma Ayats | | B60K 6/365 |
| | | | | 475/207 |
| 2009/0250276 A1 | 10/2009 | Goodwin et al. | | |
| 2011/0053722 A1* | 3/2011 | Hwang | | F16H 3/72 |
| | | | | 475/1 |
| 2011/0111904 A1* | 5/2011 | Hwang | | F16H 3/72 |
| | | | | 475/1 |
| 2012/0021865 A1* | 1/2012 | Hwang | | F16H 3/72 |
| | | | | 475/330 |
| 2012/0021866 A1* | 1/2012 | Hwang | | F16H 3/72 |
| | | | | 475/330 |

\* cited by examiner

FIG. 10

HYBRID POWER INTEGRATED TRANSMISSION SYSTEM AND METHOD THEREOF

BACKGROUND OF THE INVENTION

1. Field of the Invention

The present invention relates to a hybrid power integrated transmission system and method thereof. Particularly, the present invention relates to the hybrid gas and electric integrated transmission system and method thereof. More particularly, the present invention relates to the HEV (hybrid electric vehicle) integrated transmission system and method thereof.

2. Description of the Related Art

U.S. Pat. No. 8,409,052, entitled "Starting Method for Hybrid Electric Vehicle and System Architecture of Hybrid Electric Vehicle," discloses a hybrid electric vehicle system, including a hybrid electric vehicle, a battery module, a battery heater, a first switch, an integrated starter generator and an internal combustion engine.

The starting method for hybrid electric vehicle disclosed in U.S. Pat. No. 8,409,052 includes the steps of (a1) as the temperature of the battery module of the hybrid electric vehicle is below a first threshold temperature, allowing the vehicle control unit of the hybrid electric vehicle to turn. on the first switch; (a2) converting the DC power transmitted from the battery module to the integrated starter generator of the vehicle through the first switch into a first AC power by the integrated starter generator which is operating under the starter mode, and starting the internal combustion engine of the vehicle with the first AC power; and (a3) executing a heating process to warm up the battery module by a battery heater, in which the charging line between the integrated starter generator and the battery module is cut off and the integrated starter generator is operating under a rectifier submode, thereby allowing the integrated starter generator to supply electric power to the battery heater in order to heat the battery module.

However, the hybrid electric vehicle system disclosed in U.S. Pat. No. 8,409,052 doesn't provide a hybrid power integrated transmission system for controllably integrating a variable power input and further transmitting a variable integrated power output. Hence, there is a need of providing a hybrid power integrated transmission system in the hybrid electric vehicle system for integrating a variable power input and further transmitting a variable integrated power output.

Another U.S. Patent Application No. 20090250276, entitled "Hybrid Electric Vehicle and Methods of Production," discloses a hybrid electric vehicle system. The hybrid electric vehicle system includes an electric motor, at least one battery pack, at least one capacitor bank, at least one generator, at least one engine and a controller. The controller is coupled to the at least one battery pack, the at least one capacitor bank and the at least one engine.

The power systems disclosed in U.S. Patent Application No. 20090250276 further include at least one battery pack, at least one capacitor bank, at least one generator and a controller. The controller is coupled to the at least one battery pack, the at least one capacitor bank and the at least one generator. In addition, modified gear boxes include an epicyclic roller arrangement and a control mechanism coupled to an output shaft.

However, the hybrid electric vehicle system disclosed in U.S. Patent Application No. 20090250276 also doesn't provide a hybrid power integrated transmission system for controllably integrating a variable power input and further transmitting a variable integrated power output. Hence, there is still a need of providing a hybrid power integrated transmission system in the hybrid electric vehicle system for integrating a variable power input and further transmitting a variable integrated power output.

Another U.S. Pat. No. 8,303,447, entitled "Power Transmission System of Hybrid Electric Vehicle," discloses a hybrid power transmission system, including an input shaft, a first planetary gear set (i.e. gear train) having first, second, and third rotation elements, wherein the first rotation element connects to a first motor/generator and the third rotation element connects to the input shaft, a second planetary gear set having fourth, fifth, and sixth rotation elements, wherein the fourth rotation element connects to the second rotation element and a second motor/generator, and the fifth rotation element is engagable with the first rotation element, an output gear connected to the sixth rotation element, a first clutch selectively connecting the first rotation element with the fifth rotation element, a second clutch selectively connecting two rotation elements among the rotation elements of the first planetary gear set, a first brake interposed between the fifth rotation element and a transmission housing, and a second brake interposed between the fourth rotation element and the transmission housing.

However, the first planetary gear set and the second planetary gear set of the hybrid power transmission system disclosed in U.S. Pat. No. 8,303,447 may increase the manufacturing cost and complicate the manufacturing process. The hybrid power transmission system also doesn't provide a function of hybrid power integrated transmission between the input shaft and the output gear for controllably integrating a variable power input and further transmitting a variable integrated power output. Hence, there is still a need of providing a hybrid power integrated transmission system in the hybrid electric vehicle for integrating a variable power input and further transmitting a variable integrated power output.

Another U.S. Pat. No. 8,500,585, entitled "Power Transmission System of Hybrid Electric Vehicle," discloses a hybrid power transmission system, including an input shaft, a first planetary gear set having a third rotation element fixedly connected to the input shaft and a second rotation element fixedly connected to a first motor/generator, a second planetary gear set having a fourth rotation element selectively connected to the second rotation element, a fifth rotation element directly connected to the first rotation element, and a sixth rotation element fixedly connected to a second motor/generator, an output gear connected to the fifth rotation element, a first clutch selectively connecting the second rotation element with the fourth rotation element, a second clutch adapted to selectively connect the third rotation element with the second motor/generator, a first brake interposed between the fourth rotation element and a transmission housing, and a second brake interposed between the sixth rotation element and the transmission housing.

However, the first planetary gear set and the second planetary gear set of the hybrid power transmission system disclosed in U.S. Pat. No. 8,500,585 may increase the manufacturing cost and complicate the manufacturing process. The hybrid power transmission system also doesn't provide a function of hybrid power integrated transmission between the input shaft and the output gear for controllably integrating a variable power input and further transmitting a variable integrated power output. Hence, there is still a need of providing a hybrid power integrated transmission system in the hybrid electric vehicle for integrating a variable power input and further transmitting a variable integrated power output.

Another U.S. Pat. No. 8,548,662, entitled "Transmission Control for a Hybrid Electric Vehicle with Regenerative Braking," discloses a hybrid electric vehicle. The hybrid vehicle includes a first transmission mechanism, a second transmission mechanism, an electric motor connected to the first transmission mechanism, an internal combustion engine, a motor control unit and a transmission control unit. The transmission control unit changes, when the motor control unit executes a decelerating regeneration in response to a braking request of a driver, and when a braking request amount of the braking request is decreased by a predetermined amount while a predetermined shift range attained by the first transmission mechanism is selected, a shift range to a shift range on a lower-speed side than the predetermined shift range, which is attained by the first transmission mechanism, and to maintain the predetermined shift range when the braking request amount is not decreased. However, the first transmission mechanism and the second transmission mechanism of the hybrid power transmission system disclosed in U.S. Pat. No. 8,548,662 may increase the manufacturing cost and complicate the manufacturing process. The transmission control unit also doesn't provide a function of hybrid power integrated transmission between the electric motor and the internal combustion engine for controllably integrating a variable power input and further transmitting a variable integrated power output. Hence, there is still a need of providing a hybrid power integrated transmission system in the hybrid electric vehicle for integrating a variable power input and further transmitting a variable integrated power output.

Moreover, the hybrid power transmission system of the hybrid electric vehicle disclosed in U.S. Pat. No. 8,409,052, U.S. Patent Application No. 20090250276, U.S. Pat. Nos. 8,303,447, 8,500,585 and 8,548,662 must be arranged with a prime motor, a motor and generator combined assembly and an engine which are connected with an output end via a transmission mechanism and must be formed with three spindles and two freedom rotor shafts. The prime motor and the engine supply power to the transmission mechanism, cooperating the motor and generator combined assembly with rotational speeds of the two spindles of the prime motor and the engine. Disadvantageously, the control method of the hybrid power transmission system is complicated.

The above-mentioned patents and publications are incorporated herein by reference for purposes including, but not limited to, indicating the background of the present invention and illustrating the state of the art.

As is described in greater detail below, the present invention provides a hybrid power integrated transmission system and method thereof. Two planetary gear trains and two transmission-connecting sets are utilized to variably control power input and output. A transmission control end is provided to controllably shift a free transmission end between a power input end and a power output end. The hybrid power integrated transmission system and method of the present invention can achieve increasing the efficiency of power conversion and transmission.

SUMMARY OF THE INVENTION

The primary objective of this invention is to provide a hybrid power integrated transmission system and method thereof. Two planetary gear trains and two transmission-connecting sets are utilized to variably control power input and output. A transmission control end is provided to controllably shift a free transmission end between a power input end and a power output end. Accordingly, the hybrid power integrated transmission system and method of the present invention is successful in increasing the efficiency of power conversion and transmission.

The hybrid power integrated transmission system in accordance with an aspect of the present invention includes:
a first planetary gear train;
a second planetary gear train;
a first transmission-connecting set connected between the first planetary gear train and the second planetary gear train, with the first transmission-connecting set having a first power input end;
a second transmission-connecting set connected between the first planetary gear train and the second planetary gear train, with the second transmission-connecting set having a second power input end, a first power output end and a free transmission end;
wherein the hybrid power integrated transmission system is operated to controllably shift the free transmission end between a second power output end and a third power input end; and
wherein a power is converted and stored via the second power output end and a stored power supplies to the hybrid power integrated transmission system via the second power input end or the third power input end.

In a separate aspect of the present invention, the first planetary gear train includes a first connection end and a second connection end and the second planetary gear train includes a third connection end and a fourth connection end, with the first transmission-connecting set connected between the first connection end of the first planetary gear train and the third connection end of the second planetary gear train and the second transmission-connecting set connected between the second connection end of the first planetary gear train and the fourth connection end of the second planetary gear train.

In a further separate aspect of the present invention, the first planetary gear train and the second planetary gear train are positive-ratio drive train types or negative-ratio drive train types.

In a yet further separate aspect of the present invention, the first planetary gear train includes a first sun gear, a first sun-gear rotational axle, a second sun gear, a second sun-gear rotational axle, a planet gear carrier and at least one compound planet gear and the second planetary gear train includes a sun gear, a sun-gear rotational axle, a ring gear, a ring gear rotational axle, a planet gear carrier and at least one planet gear.

In a yet further separate aspect of the present invention, the first planetary gear train or the second planetary gear train includes three freedom rotor shafts.

The hybrid power integrated transmission method in accordance with an aspect of the present invention includes:
providing a first power input end on a first transmission-connecting set;
providing a second power input end, a first power output end and a free transmission end on a second transmission-connecting set;
connecting the first transmission-connecting set between the first planetary gear train and the second planetary gear train;
connecting the second transmission-connecting set between the first planetary gear train and the second planetary gear train;
controllably shift the free transmission end between a second power output end and a third power input end; and
supplying a power to the second power output end for converting and storing in a predetermined power storage device and further supplying a stored power to the hybrid power integrated transmission system via the second power input end or the third power input end.

In a separate aspect of the present invention, the first planetary gear train includes a first connection end and a second connection end and the second planetary gear train includes a third connection end and a fourth connection end, further connecting the first transmission-connecting set between the first connection end of the first planetary gear train and the third connection end of the second planetary gear train and connecting the second transmission-connecting set between the second connection end of the first planetary gear train and the fourth connection end of the second planetary gear train.

In a further separate aspect of the present invention, the first planetary gear train and the second planetary gear train are positive-ratio drive train types or negative-ratio drive train types.

In a yet further separate aspect of the present invention, the first planetary gear train includes a first sun gear, a first sun-gear rotational axle, a second sun gear, a second sun-gear rotational axle, a planet gear carrier and at least one compound planet gear and the second planetary gear train includes a sun gear, a sun-gear rotational axle, a ring gear, a ring gear rotational axle, a planet gear carrier and at least one planet gear.

In a yet further separate aspect of the present invention, the first planetary gear train or the second planetary gear train includes three freedom rotor shafts.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a hybrid power integrated transmission system and control or operational method thereof in accordance with the preferred embodiment of the present invention is suitable for a wide variety of transmission-related mechanisms of hybrid energy sources and is applicable to transmission gearboxes of hybrid electric vehicles, hybrid power bicycles, hybrid power boats, solar power stations, incinerators, ocean power generators (e.g., tidal power generator, wave power generator or ocean current power generator) or wind power generators, which are not limitative of the present invention.

Figure 1:
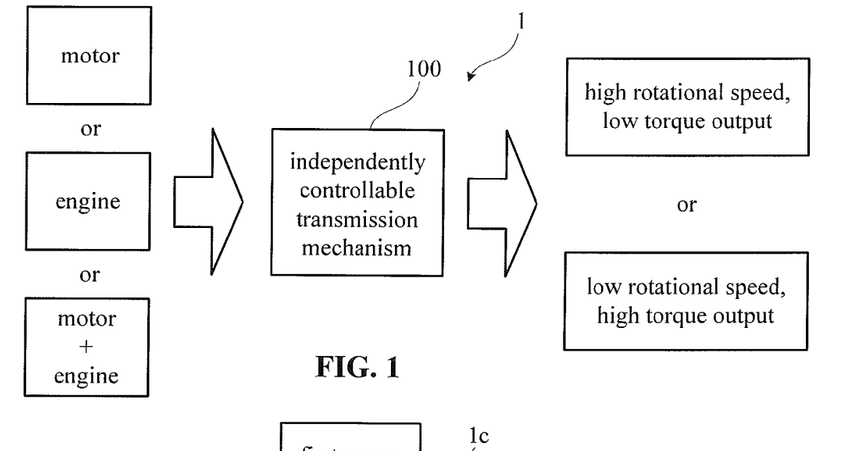
FIG. 1 is a block diagram of a hybrid power integrated transmission system operated in integrating power inputs and outputting integrated power in accordance with a preferred embodiment of the present invention.

FIG. 1 shows a block diagram of the hybrid power integrated transmission system operated in integrating power inputs and outputting integrated power in accordance with a preferred embodiment of the present invention, including fundamentally operational modes of the hybrid power input functions and the hybrid power output functions, for example. Referring now to FIG. 1, the hybrid power integrated transmission system 1 includes at least one independently controllable transmission mechanism 100 which is operated to integrate a function of complete power supply from a motor (vehicle starting state), a function of complete power supply from an engine (engine hi-speed operation state) and a function of integrated power supply from a motor and an engine (vehicle acceleration state) to thereby provide several operational modes, including a hi-speed low-torque output mode and a low-speed hi-torque output mode or other similar operational modes.

Figure 2:
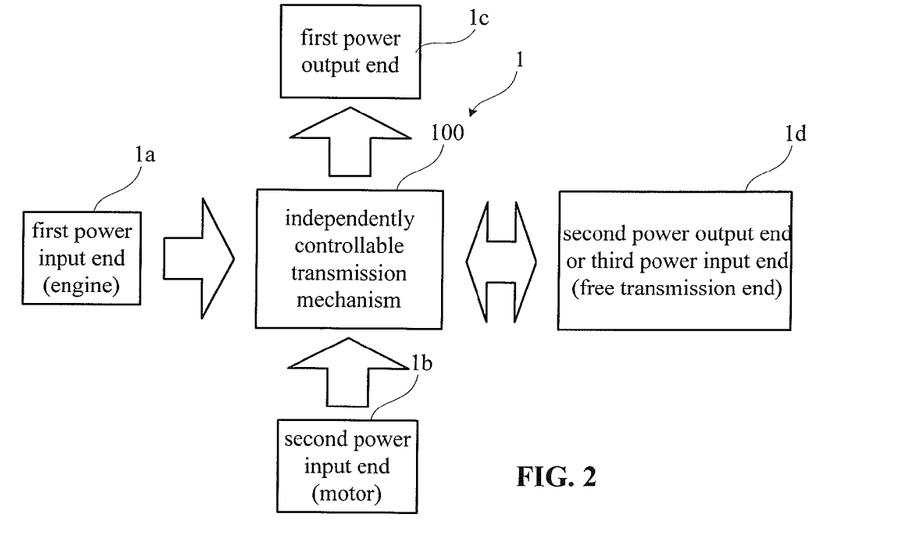
FIG. 2 is a block diagram of power input and output directions of the hybrid power integrated transmission system in accordance with the preferred embodiment of the present invention.

FIG. 2 shows a block diagram of power input and output directions of the hybrid power integrated transmission system in accordance with the preferred embodiment of the present invention, corresponding to that of FIG. 1. Referring to FIGS. 1 and 2, the hybrid power integrated transmission system 1 includes a first power input end 1a, a second power input end 1b, a first power output end 1c and a second power output or third power input end 1d which are appropriately arranged in the hybrid power integrated transmission system 1.

Figure 3:
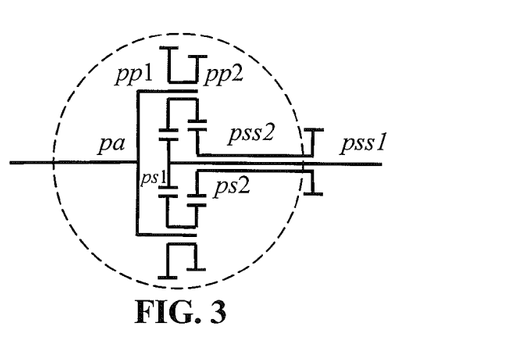
FIG. 3 is an internal schematic view of a planetary gear train with a positive-ratio drive train type applied in the hybrid power integrated transmission system in accordance with the preferred embodiment of the present invention.

FIG. 3 shows an internal schematic view of a planetary gear train with a positive-ratio drive train type applied in the hybrid power integrated transmission system in accordance with the preferred embodiment of the present invention shown in FIGS. 1 and 2. Referring to FIG. 3, the positive-ratio drive train type has three freedom rotor shafts or a rotor device having a similar mechanism. By way of example, the positive-ratio drive train type planetary gear train includes a first sun gear ps1, a first sun-gear rotational axle pss1, a second sun gear ps2, a second sun-gear rotational axle pss2, at least one compound planet gear pp1, pp2 and a planet gear carrier pa. When assembled, the compound planet gear pp1, pp2 is commonly engaged with the first sun gear ps1 and the second sun gear ps2.

With continued reference to FIG. 3, the positive-ratio drive train type planetary gear train provides three freedom rotor shafts formed from the first sun-gear rotational axle pss1, the second sun-gear rotational axle pss2 and the planet gear carrier pa. In operation, the first sun-gear rotational axle pss1 and the second sun-gear rotational axle pss2 have the same rotational direction if the planet gear carrier pa is fixed. The term "basic speed-ratio" defines a ratio of the rotational speed of the first sun-gear rotational axle pss1 with respect to the planet gear carrier pa to that of the second sun-gear rotational axle pss2 with respect to the planet gear carrier pa. A value of the basic speed-ratio is positive.

Figure 4:
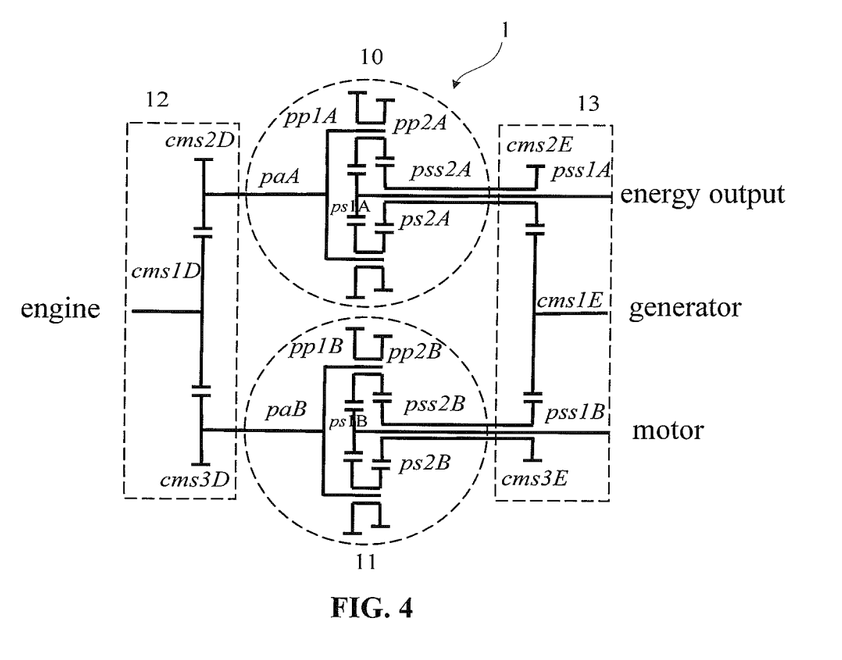
FIG. 4 is an internal schematic view of the hybrid power integrated transmission system in accordance with the preferred embodiment of the present invention.
Figure 5:
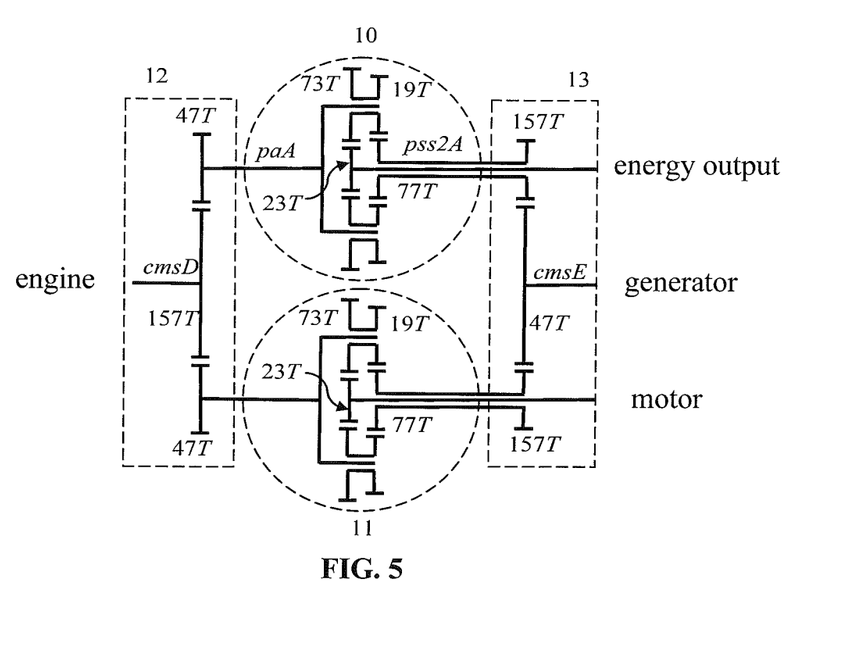
FIG. 5 is an internal schematic view and numbers of gear teeth of the hybrid power integrated transmission system in accordance with the preferred embodiment of the present invention.

FIG. 4 shows an internal schematic view of the hybrid power integrated transmission system in accordance with the preferred embodiment of the present invention shown in FIGS. 1 and 2. FIG. 5 shows an internal schematic view and numbers of gear teeth of the hybrid power integrated transmission system in accordance with the preferred embodiment of the present invention shown in FIG. 4. Referring to FIGS. 4 and 5, the hybrid power integrated transmission system 1 includes a first planetary gear train 10, a second planetary gear train 11, a first transmission-connecting set 12 and a second transmission-connecting set 13 which are appropriately connected to form the hybrid power integrated transmission system 1 with the arrangement of predetermined numbers of gear teeth.

Figure 6:
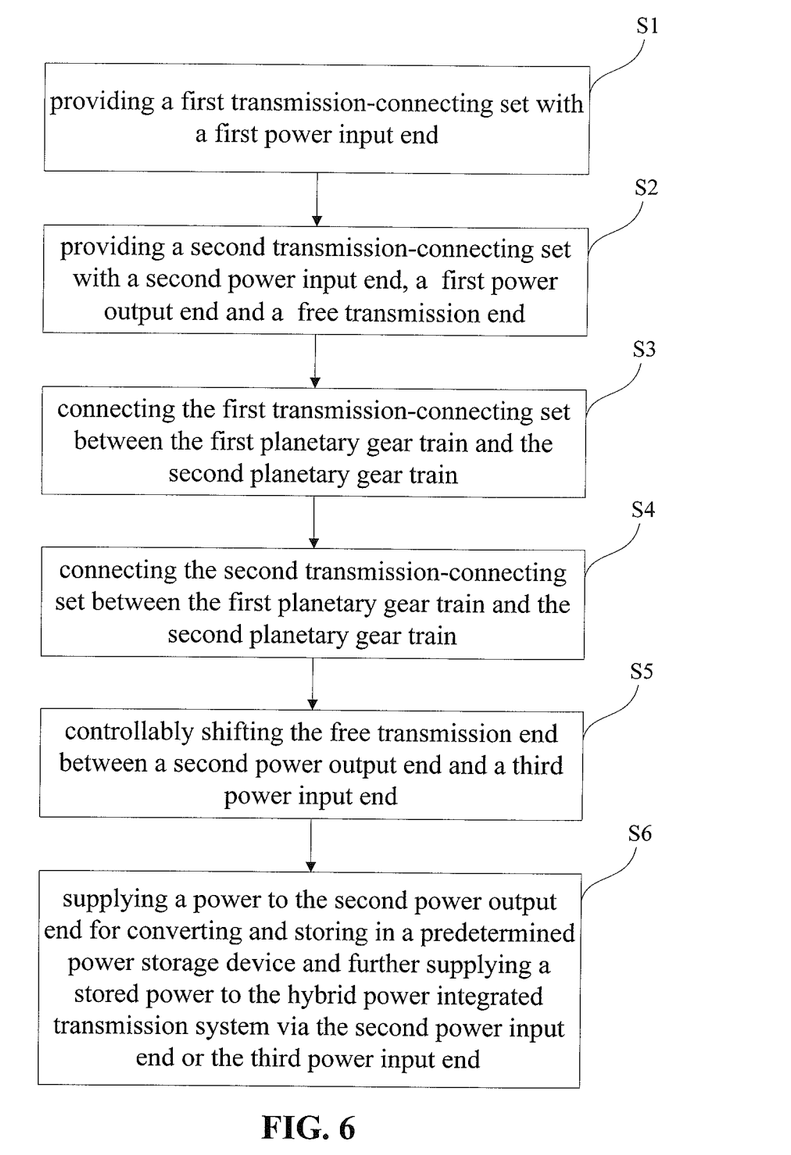
FIG. 6 is a flow chart of a hybrid power integrated transmission method in accordance with a preferred embodiment of the present invention.

FIG. 6 shows a flow chart of a hybrid power integrated transmission method in accordance with a preferred embodiment of the present invention, corresponding to the hybrid power integrated transmission system shown in FIGS. 4 and 5. Referring to FIGS. 2, 4, 5 and 6, the hybrid power integrated transmission method includes the step S1: providing a first power input end 1a, as best shown in FIG. 2, on the first transmission-connecting set 12. By way of example, the first power input end 1a selectively connects with at least one engine (e.g. internal combustion engine) or other power sources.

Still referring to FIGS. 2, 4, 5 and 6, the hybrid power integrated transmission method includes the step S2: providing a second power input end, a first power output end and a free transmission end on the second transmission-connecting set 13. As best shown in FIG. 2, the second power input end 1b, the first power output end 1c and the second power output or third power input end 1d (free transmission end) are provided on the second transmission-connecting set 13. By way of example, the second power input end 1b is performed as a control end and selectively connects with an electric motor (or servo motor) or other power sources. The first power output end 1c is performed as a prime power output end of the hybrid power integrated transmission system 1 while the second power output or third power input end 1d is performed as a free transmission end of the hybrid power integrated transmission system 1. Furthermore, the second power output or third power input end 1d selectively connects with a motor and generator combined device or a similar device.

Referring back to FIGS. 4, 5 and 6, the hybrid power integrated transmission method includes the step S3: connecting the first transmission-connecting set 12 between the first planetary gear train 10 and the second planetary gear train 11. As best shown in the upper, middle portion of FIG. 4, the first planetary gear train 10 has a first connection end and a second connection end which are provided on two sides of the first planetary gear train 10. As best shown in the lower, middle portion of FIG. 4, the second planetary gear train 11 has a third connection end and a fourth connection end which are provided on two sides of the second planetary gear train 11. When assembled, the first transmission-connecting set 12 mechanically connects between the first connection end of the first planetary gear train 10 and the third connection end of the second planetary gear train 11, as best shown in the left portion of FIG. 4.

Still referring to FIGS. 4, 5 and 6, the hybrid power integrated transmission method includes the step S4: connecting the second transmission-connecting set 13 between the first planetary gear train 10 and the second planetary gear train 11. When assembled, the second transmission-connecting set 13 mechanically connects between the second connection end of the first planetary gear train 10 and the fourth connection end of the second planetary gear train 11, as best shown in the right portion of FIG. 4.

Still referring to FIGS. 4, 5 and 6, the hybrid power integrated transmission method includes the step S5: controllably shift the free transmission end between a second power output end and a third power input end for integrating input power and transmitting the integrated power. Advantageously, the second power output or third power input end 1d is operated to transmit the integrated power via the second power output end or to recycle waste power (i.e. braking energy or downhill driving energy) via the third power input end.

Still referring to FIGS. 4, 5 and 6, the hybrid power integrated transmission method includes the step S6: once reducing or terminating power transmission of the first power output end 1c, alternatively supplying the power to the second power output end for converting kinetic energy into electric energy (i.e. driving a generator) and storing it in a predetermined power storage device (i.e. battery) via the second power output end of the second power output or third power input end 1d. Furthermore, a stored power is incorporated into the hybrid power integrated transmission system 1 via the second power input end 1b by utilizing electric energy of the battery to drive a motor or is directly supplied to the hybrid power integrated transmission system 1 via the third power input end of the second power output or third power input end 1d.

Referring back to FIG. 4, by way of example, the suitable designs (equations) of the hybrid power integrated transmission system 1 in accordance with the present invention are given as:

(i) if $\alpha \neq \beta$, $\alpha \neq 1$ and $\beta \neq 1$, $$i_{0a} = \frac{n_{pss1A} - n_{paA}}{n_{pss2A} - n_{paA}} = \frac{N_{pp1A} \times N_{ps2A}}{N_{ps1A} \times N_{pp2A}} \qquad (1)$$
$$= \frac{\alpha(\beta - 1)}{\beta(\alpha - 1)}$$

$$i_{0B} = \frac{n_{pss1B} - n_{paB}}{n_{pss2B} - n_{paB}} = \frac{N_{pp1B} \times N_{ps2B}}{N_{ps1B} \times N_{pp2B}} \qquad (2)$$
$$= \frac{\beta - 1}{\alpha - 1}$$

(ii) if $\alpha = \beta = 1$, $i_{0A} = i_{0B}$ \qquad (3)

where $i_{OA}$ is a basic speed ratio of the first planetary gear train 10, $i_{OB}$ is a basic speed ratio of the second planetary gear train 11, n is a rotational speed, and N is a teeth number of gear.

With continued reference to FIG. 4, by way of example, the design (ii) with the condition of α=β=1 is designated to practice the preferred embodiment of the present invention such that the specifications of gears are similar for reducing the manufacturing cost. However, the relation between rotational speeds of the first power output end 1c and the second power input end 1b (control end) is linear and the coefficient is 1. The equation of the relation is given as:

$$n_{output} = n_{motor} \quad (4)$$

where n is a rotational speed.

With continued reference to FIG. 4, by way of example, the hybrid power integrated transmission system 1 selectively connects with an engine, an electric motor and a motor and generator combined device and a relation of the rotational speeds thereof is given as:

$$n_{generator} = \frac{i_{OA}-1}{i_{OA}} \cdot \frac{n_{paA}}{n_{engine}} \cdot \frac{n_{motor}}{n_{pss2A}} \cdot n_{engine} + \frac{1}{i_{OA}} \cdot \frac{n_{motor}}{n_{pss2A}} \cdot n_{output}$$

$$= \frac{i_{OA}-1}{i_{OA}} \cdot \frac{N_{cmg1D}}{N_{cmg2D}} \cdot \frac{N_{cmg2E}}{N_{cmg1E}} \cdot n_{engine} - \frac{1}{i_{OA}} \cdot \frac{N_{cmg2E}}{N_{cmg1E}} \cdot n_{output}. \quad (5)$$

where n is a rotational speed.

With continued reference to FIG. 4, by way of example, the hybrid power integrated transmission system 1 is selectively designed with clockwise and counterclockwise directions of rotation identified as positive and negative respectively, and input and output power of gears of the independently controllable transmission mechanism 100 identified as positive and negative respectively. The power of rotational shafts thereof is given as:

$$P_X = T_X n_X \quad (6)$$

where P is power, T is torque, n is a rotational speed and x is a shaft.

With continued reference to FIG. 4, by way of example, the power output of the hybrid power integrated transmission system 1 in accordance with the conservation law of energy is given as:

$$P_{output} = -(P_{engine} + P_{motor}) \quad (7)$$

where P is power.

With continued reference to FIG. 4, by way of example, the torque relation of the engine and the motor to the output end applied in the hybrid power integrated transmission system 1 is given as:

$$T_{output} = \frac{1}{1-i_{OA}} \cdot \frac{N_{cmg2D}}{N_{cmg1D}} \cdot T_{engine} - T_{motor} \quad (8)$$

where T is torque.

With continued reference to FIG. 4, by way of example, the power relation of the engine and the electric motor to the motor and generator combined device applied in the hybrid power integrated transmission system 1 is given as:

$$P_{motor/generator} = \left(\frac{1}{1-i_{OA}} \cdot \frac{n_{output}}{n_{paA}} - 1\right) \cdot P_{engine} \quad (9)$$

where P is power and n is a rotational speed.

With continued reference to FIG. 4, by way of example, the hybrid power integrated transmission system 1 is applied in a hybrid electric vehicle, with engine power 74 kW and rotational speed ranging between 0-5,200 rpm, with motor power 61 kW and rotational speed ranging between 1,450-6,500 rpm, with motor and generator combined power 42 kW and rotational speed ranging between −6,500 rpm to 6,500 rpm, and with total power output 100 kW.

Referring back to FIG. 5, by way of example, numbers of gear teeth applied in the hybrid power integrated transmission system 1 are designed with the condition α=1·β=1 and all numbers of gear teeth is calculated in equation (3), as shown in Table 1. The numbers of gear teeth applied in the hybrid power integrated transmission system 1 are correspondingly shown in FIG. 5.

TABLE 1 numbers of gear teeth applied in the hybrid power integrated transmission system in accordance with the preferred embodiment of the present invention.

| Gear | cmg1D | cmg2D | cmg3D | cmg1E | cmg2E | cmg3E | ps1A |
|---|---|---|---|---|---|---|---|
| Number of teeth | 157 | 47 | 47 | 47 | 157 | 157 | 23 |
| Gear | ps2A | pp1A | pp2A | ps1B | ps2B | pp1B | pp2E |
| Number of teeth | 77 | 73 | 19 | 23 | 77 | 73 | 19 |

Figure 7:
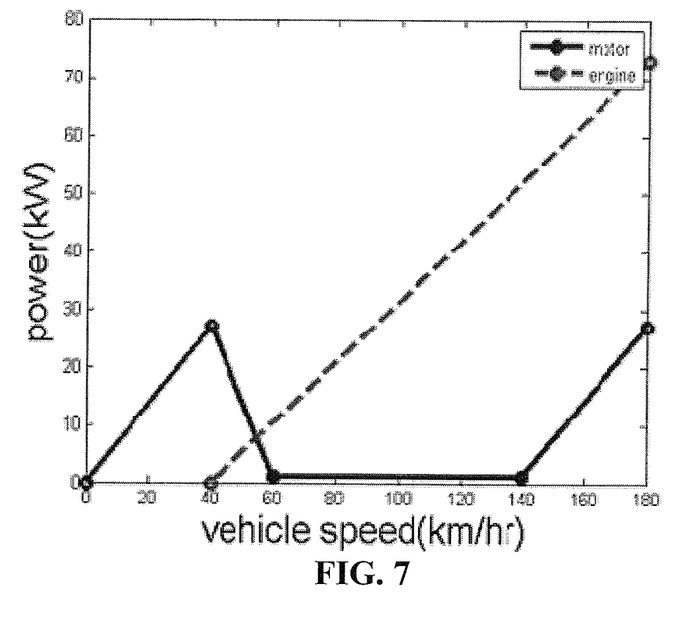
FIG. 7 is a chart illustrating power of a motor and an engine in relation to vehicle speeds applied in the hybrid power integrated transmission system in accordance with the preferred embodiment of the present invention.

FIG. 7 shows a chart illustrating power of a motor and an engine in relation to vehicle speeds applied in the hybrid power integrated transmission system in accordance with the preferred embodiment of the present invention. Referring to FIGS. 2, 4 and 7, by way of example, the hybrid power integrated transmission system 1 is controlled to operate a motor and an engine in four operational stages or more. In first operational stage, the vehicle speed is set 0-40 km/hr (vehicle starting state or low-speed driving state) and the motor is only operated to supply the power to a spindle of the first power output end 1c via the second power input end 1b. In second operational stage, the vehicle speed is set 40-60 km/hr (medium-speed driving state) and the engine starts running to supply power via the first power input end 1a while the motor is controlled to gradually reduce supplying the power via the second power input end 1b. In third operational stage, the vehicle speed is set 60-140 km/hr (hi-speed driving state) and the engine runs to supply main power via the first power input end 1a while the motor is only controlled to adjust an output rotational speed of the hybrid power integrated transmission system 1. In fourth operational stage, the vehicle speed is set 140-180 km/hr (top-speed driving state) and in addition to the engine, the motor is operated to supply auxiliary power via the second power input end 1b.

Figure 8:
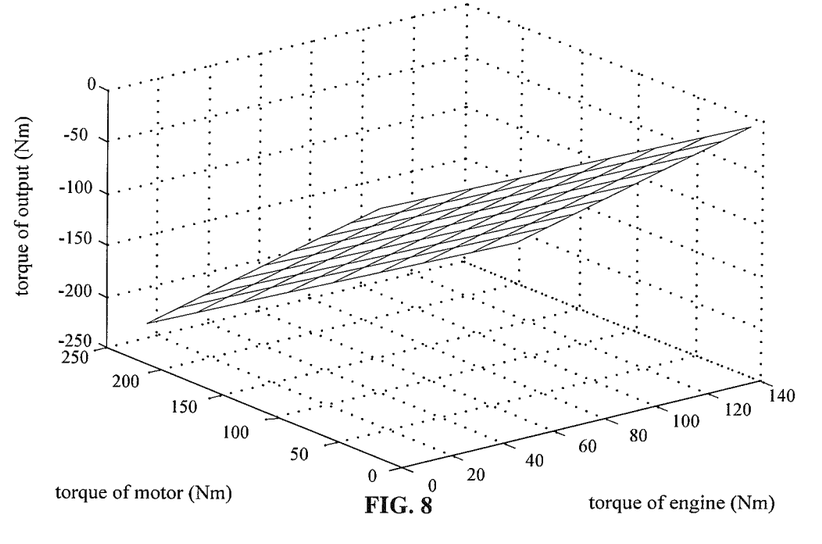
FIG. 8 is a chart illustrating torques of a first power output end in relation to torques of a first power input end (engine) and a second power input end (motor) simulated in the hybrid power integrated transmission system in accordance with the preferred embodiment of the present invention.

FIG. 8 is shows chart illustrating torques of a first power output end in relation to torques of a first power input end (engine) and a second power input end (motor) simulated in the hybrid power integrated transmission system in accordance with the preferred embodiment of the present invention shown in FIG. 2. Referring to FIG. 8, by way of example, the hybrid power integrated transmission system 1 selectively connects with the motor providing a predetermined torque 220 Nm and the engine providing a predetermined torque 240 Nm. The simulated output torques of the first power output end 1a is calculated in equation (8).

Figure 9:
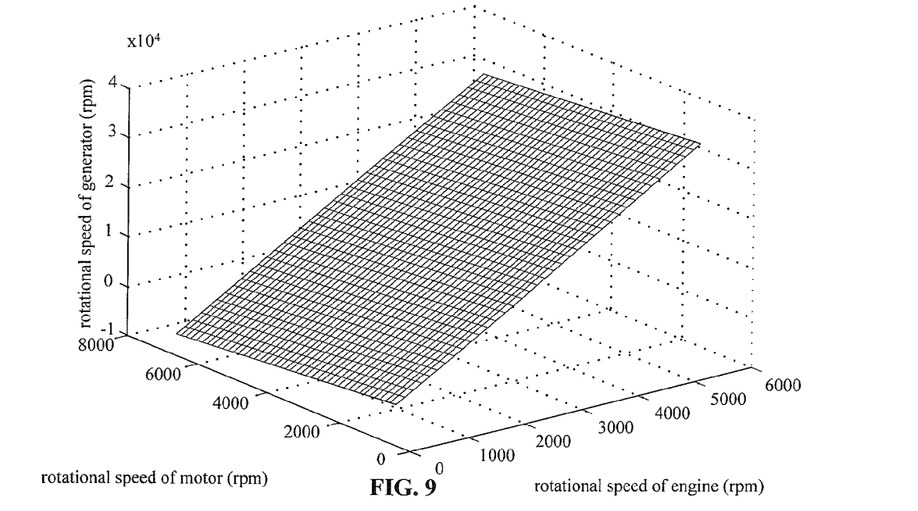
FIG. 9 is a chart illustrating rotational speeds of a second power output end or a third power input end (motor/generator combined assembly, free transmission end) in relation to those of a first power input end (engine) and a second power input end (motor) simulated in the hybrid power integrated transmission system in accordance with the preferred embodiment of the present invention.

FIG. 9 shows a chart illustrating rotational speeds of a second power output end or a third power input end (motor/generator combined assembly, free transmission end) in relation to those of a first power input end (engine) and a second power input end (motor) simulated in the hybrid power integrated transmission system in accordance with the preferred embodiment of the present invention shown in FIG. 2. Referring to FIG. 9, by way of example, the hybrid power integrated transmission system 1 selectively connects with the motor providing a predetermined rotational speed 6,500 rpm and the engine providing a predetermined rotational speed 5,200 rpm. The simulated output rotational speeds of the motor, the engine and the generator are calculated in equation (5).

Figure 10:
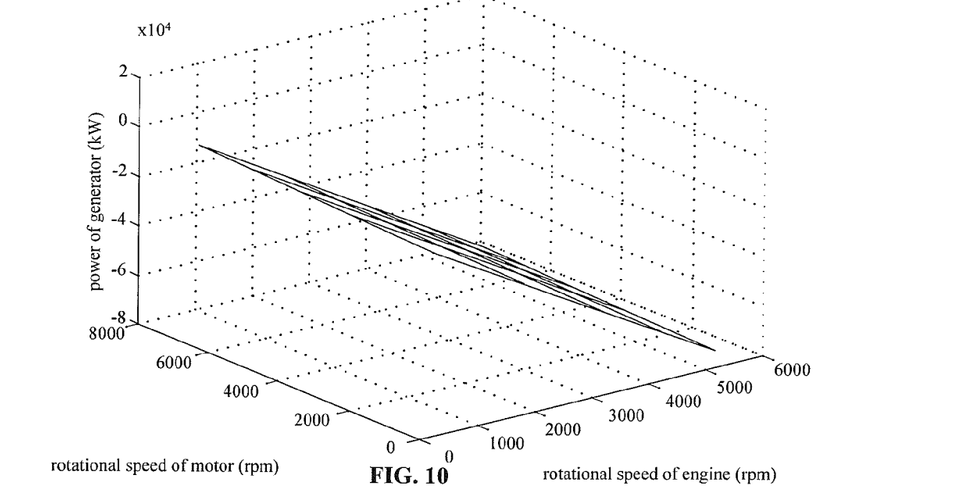
FIG. 10 is a chart illustrating rotational speeds of a first power input end (engine) and a second power input end (motor) in relation to power of a second power output end or a third power input end (motor/generator combined assembly, free transmission end) simulated in the hybrid power integrated transmission system in accordance with the preferred embodiment of the present invention.

FIG. 10 shows a chart illustrating power of a second power output end or a third power input end (motor/generator combined assembly, free transmission end) in relation to rotational speeds of a first power input end (engine) and a second power input end (motor) simulated in the hybrid power integrated transmission system in accordance with the preferred embodiment of the present invention shown in FIG. 2. Referring to FIG. 10, by way of example, the hybrid power integrated transmission system 1 simulated to operate in vehicle braking or downhill driving state and the generator output power to a predetermined battery for charging or a predetermined load. The upmost rotational speeds of the motor and the engine are 6,500 rpm and 5,200 rpm respectively. The recycled power in various rotational speeds of the motor and the engine are calculated in equation (9).

The hybrid power integrated transmission system in accordance with the preferred embodiment of the present invention comprises one motor and one motor and generator combined device connecting with two rotary shaft ends, and further comprises an engine connecting with an input end and an output end such that the hybrid power integrated transmission system has two freedom rotor shafts and two freedom torque shafts. The rotational speed of the power output end only relates that of a prime motor with a linear function and will not interference with that of the motor and generator combined device so as to simplify the entire structure. In order to reduce the manufacturing cost, a single-function generator can replace the motor and generator combined device.

The design of one motor and one motor and generator combined device applied in the hybrid power integrated transmission system in accordance with the preferred embodiment of the present invention can simplify the entire control provided with the planetary gear train (epicyclical gear train) to avoid a high manufacturing cost of planet gears. In driving vehicles, the hybrid power integrated transmission system in accordance with the preferred embodiment of the present invention can provides several operational modes of vehicle starting, hi-speed driving or braking to meet the requirement of the hybrid electric vehicle.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A hybrid power integrated transmission system comprising:
    a first planetary gear train;
    a second planetary gear train;
    a first transmission-connecting set connected between the first planetary gear train and the second planetary gear train, with the first transmission-connecting set having a first power input end;
    a second transmission-connecting set connected between the first planetary gear train and the second planetary gear train, with the second transmission-connecting set having a second power input end, a first power output end and a free transmission end;
    wherein the hybrid power integrated transmission system is operated to controllably shift the free transmission end between a second power output end and a third power input end; and
    wherein a power is converted and stored via the second power output end and a stored power supplies to the hybrid power integrated transmission system via the second power input end or the third power input end.

2. The hybrid power integrated transmission system as defined in claim 1, wherein the first planetary gear train includes a first connection end and a second connection end and the second planetary gear train includes a third connection end and a fourth connection end, with the first transmission-connecting set connected between the first connection end of the first planetary gear train and the third connection end of the second planetary gear train and the second transmission-connecting set connected between the second connection end of the first planetary gear train and the fourth connection end of the second planetary gear train.

3. The hybrid power integrated transmission system as defined in claim 1, wherein the first planetary gear train and the second planetary gear train are positive-ratio drive train types or negative-ratio drive train types.

4. The hybrid power integrated transmission system as defined in claim 1, wherein the first planetary gear train includes a first sun gear, a first sun-gear rotational axle, a second sun gear, a second sun-gear rotational axle, a planet gear carrier and at least one compound planet gear.

5. The hybrid power integrated transmission system as defined in claim 1, wherein the second planetary gear train includes a sun gear, a sun-gear rotational axle, a ring gear, a ring gear rotational axle, a planet gear carrier and at least one planet gear.

6. The hybrid power integrated transmission system as defined in claim 1, wherein the first planetary gear train or the second planetary gear train includes three freedom rotor shafts.

7. A hybrid power integrated transmission method comprising:
    providing a first power input end on a first transmission-connecting set;
    providing a second power input end, a first power output end and a free transmission end on a second transmission-connecting set;
    connecting the first transmission-connecting set between the first planetary gear train and the second planetary gear train;
    connecting the second transmission-connecting set between the first planetary gear train and the second planetary gear train;
    controllably shift the free transmission end between a second power output end and a third power input end; and
    supplying a power to the second power output end for converting and storing in a predetermined power storage device and further supplying a stored power to the hybrid power integrated transmission system via the second power input end or the third power input end.

8. The hybrid power integrated transmission method as defined in claim 7, wherein the first planetary gear train includes a first connection end and a second connection end and the second planetary gear train includes a third connection end and a fourth connection end, further connecting the first transmission-connecting set between the first connection end of the first planetary gear train and the third connection end of the second planetary gear train and connecting the second transmission-connecting set between the second connection end of the first planetary gear train and the fourth connection end of the second planetary gear train.

9. The hybrid power integrated transmission method as defined in claim 7, wherein the first planetary gear train and the second planetary gear train are positive-ratio drive train types or negative-ratio drive train types.

10. The hybrid power integrated transmission method as defined in claim 7, wherein the first planetary gear train includes a first sun gear, a first sun-gear rotational axle, a second sun gear, a second sun-gear rotational axle, a planet gear carrier and at least one compound planet gear.

11. The hybrid power integrated transmission method as defined in claim 7, wherein the second planetary gear train includes a sun gear, a sun-gear rotational axle, a ring gear, a ring gear rotational axle, a planet gear carrier and at least one planet gear.

12. The hybrid power integrated transmission method as defined in claim 7, wherein the first planetary gear train or the second planetary gear train includes three freedom rotor shafts.

* * * * *